(12) United States Patent
Hauber et al.

(10) Patent No.: US 9,422,193 B2
(45) Date of Patent: Aug. 23, 2016

(54) STRUVITE-K AND SYNGENITE COMPOSITION FOR USE IN BUILDING MATERIALS

(71) Applicant: CertainTeed Gypsum, Inc., Malvern, PA (US)

(72) Inventors: Robert J. Hauber, Land O Lakes, FL (US); Gerald D. Boydston, Cody, WY (US); Nathan Frailey, Cody, WY (US); Severine Lamberet, Gagny (FR); Gaurav V. Pattarkine, Shrewsbury, MA (US); Isaac K. Cherian, Shrewsbury, MA (US); Sergio Centurione, North Grafton, MA (US); Anirban Ghosh, Cambridge, MA (US)

(73) Assignee: CertainTeed Gypsum, Inc., Malvern, PA (US)

( * ) Notice: Subject to any disclaimer, the term of this patent is extended or adjusted under 35 U.S.C. 154(b) by 10 days.

(21) Appl. No.: 14/457,826

(22) Filed: Aug. 12, 2014

(65) Prior Publication Data
US 2015/0059621 A1    Mar. 5, 2015

Related U.S. Application Data

(60) Provisional application No. 61/865,029, filed on Aug. 12, 2013, provisional application No. 61/890,720, filed on Oct. 14, 2013, provisional application No. 61/892,581, filed on Oct. 18, 2013.

(51) Int. Cl.
*C04B 11/00* (2006.01)
*C04B 22/06* (2006.01)
(Continued)

(52) U.S. Cl.
CPC .............. *C04B 11/28* (2013.01); *C04B 12/025* (2013.01); *C04B 12/027* (2013.01); *C04B 28/34* (2013.01); *C04B 2111/0062* (2013.01)

(58) Field of Classification Search
CPC .......... C04B 11/00; C04B 22/06; C04B 22/16
See application file for complete search history.

(56) References Cited

U.S. PATENT DOCUMENTS

| 2,033,159 A | 3/1936 | Storch et al. |
| 2,562,859 A | 7/1950 | Camp |

(Continued)

FOREIGN PATENT DOCUMENTS

| DE | 3326796 C1 | 11/1984 |
| DE | 3914796 | 5/1990 |

(Continued)

OTHER PUBLICATIONS

Du Cai-yi, Yan Yun, Hu Zhi-hua, Xie Xiao-I i 1 , Wang Su-juan, "Study on New Type Phosphogypsum Lightweight Porous Material", Journal of Building Materials, vol. 11, No. 3, pp. 353-358, with English Translation.

(Continued)

*Primary Examiner* — Paul Marcantoni
(74) *Attorney, Agent, or Firm* — Vangelis Economou; Economou IP Law (57) ABSTRACT

A composition and process for the manufacture thereof for use in a hybrid building material comprising at least in part Syngenite ($K_2Ca(SO_4)_2 \cdot H_2O$) and Struvite-K ($KMgPO_4 \cdot 6H_2O$). Specified constituents, including magnesium oxide (MgO), monopotassium phosphate (MKP) and stucco (calcium sulfate hemihydrate) are mixed in predetermined ratios and the reaction proceeds through multiple phases reactions which at times are proceeding simultaneously and in parallel and reaction may even compete with each other for reagents if the Struvite-K reaction is not buffered to slow down the reaction rate). A number of variable factors, such as water temperature, pH mixing times and rates, have been found to affect resultant reaction products. Preferred ratios of chemical constituents and manufacturing parameters, including predetermined and specified ratios of Struvite-K and Syngenite may be provided for specified purposes, optimized in respect of stoichiometry to reduce the combined heat of formation to non-destructive levels.

12 Claims, 3 Drawing Sheets

(51) Int. Cl.
  *C04B 22/16* (2006.01)
  *C04B 11/28* (2006.01)
  *C04B 12/02* (2006.01)
  *C04B 28/34* (2006.01)
  *C04B 111/00* (2006.01)

(56) References Cited

U.S. PATENT DOCUMENTS

| | | | |
|---|---|---|---|
| 2,526,537 | A | 10/1950 | Camp |
| 3,179,529 | A | 4/1965 | Hickey et al. |
| 3,454,456 | A | 7/1969 | Wiley |
| 4,504,555 | A | 3/1985 | Prior et al. |
| 4,604,318 | A | 8/1986 | Prior et al. |
| 5,035,872 | A | 7/1991 | Loblich et al. |
| 5,194,087 | A | 3/1993 | Berg |
| 5,256,222 | A | 10/1993 | Shepherd et al. |
| 5,830,815 | A | 11/1998 | Wagh et al. |
| 5,846,894 | A | 12/1998 | Singh et al. |
| 6,136,088 | A | 10/2000 | Farrington |
| 6,251,979 | B1 | 6/2001 | Luongo |
| 6,319,312 | B1 | 11/2001 | Luongo |
| 6,340,388 | B1 | 1/2002 | Luongo |
| 6,391,958 | B1 | 5/2002 | Luongo |
| 6,403,688 | B1 | 6/2002 | Luongo |
| 6,998,012 | B2 | 2/2006 | Koelicker et al. |
| 7,045,476 | B1 | 5/2006 | Lally |
| 7,407,545 | B2 | 8/2008 | Wallner |
| 7,429,290 | B2 | 9/2008 | Lally |
| 7,491,267 | B2 | 2/2009 | Francis |
| 7,740,700 | B2 | 6/2010 | Wallner |
| 7,744,693 | B2 | 6/2010 | Mabey |
| 7,867,597 | B2 | 1/2011 | Feigin et al. |
| 7,914,914 | B2 | 3/2011 | Tinianov |
| 7,955,587 | B2 | 6/2011 | College |
| 8,337,993 | B2 | 12/2012 | Surace et al. |
| 8,397,864 | B2 | 3/2013 | Tinianov |
| 8,623,304 | B2 | 1/2014 | Saito et al. |
| 2002/0017222 | A1 | 2/2002 | Luongo |
| 2003/0010258 | A1 | 1/2003 | Fukuda et al. |
| 2003/0084980 | A1 | 5/2003 | Sufert et al. |
| 2005/0229809 | A1 | 10/2005 | Lally |
| 2009/0000866 | A1 | 1/2009 | Tinianov |
| 2010/0101457 | A1 | 4/2010 | Surace et al. |
| 2011/0061324 | A1 | 3/2011 | Tinianov |
| 2012/1000295 | | 4/2012 | Dubey |

FOREIGN PATENT DOCUMENTS

| | | |
|---|---|---|
| DE | 3914796 C1 | 5/1990 |
| IL | 59066 A | 7/1983 |
| JP | 4-164853 | 6/1992 |
| WO | 20060115496 A1 | 11/2006 |
| WO | 2011038277 A1 | 3/2011 |
| WO | 2012122102 A2 | 9/2012 |

OTHER PUBLICATIONS

Zhu Dinga, Biqin Donga, Feng Xinga, Ningxu Hana, Zongjin Li, "Cementing mechanism of potassium phosphate based magnesium phosphate cement", Ceramics, International, vol. 38, pp. 6281-6288 (2012).

K. Simkiss, M.G. Taylor, "Calcium Magnesium Phosphate Granules: Atomic Simulations Explaining Death", Journal of Experimental Biology vol. 190; pp. 131-139 (1990).

Du Cai-yi, Yan Yun, Hu Zhi-hua, Xie Xiao-I i 1, Wang Su-juan, "Study on New Type Phosphogypsum Lightweight Porous Material", Journal of Building Materials, vol. 11, No. 3, pp. 353-358, with English Translation, (Jun. 2008).

L.F. Amaral, I.R. Oliveira, P. Bonadia, R. Salomao, V.C. Pandolfelli, "Chelants to inhibit magnesia (MgO) hydration", Ceramics, International, vol. 37, pp. 1537-1542 (2011).

Zhu Dinga, Biqin Donga, Feng Xinga, Ningxu Hana, Zongjin Li, "Cementing mechanism of potassium phosphate based magnesium phosphate cement", Ceramics, International, vol. 38, pp. 6281-6288 (2012).

Hammi, H. et al. "Optimisation of the preparation of a phosphomagnesium cement based on struvite and K-struvite", MATEC Web of Confrences3, 01071 (2013).

S. Zhang, H.S. Shi, S.W. Huang, P. Zhang, "Dehydration characteristics of struvite-K pertaining to magnesium potassium phosphate cement system in non-isothermal condition" Journal of Thermal Analysis and Calorimetry vol. 111, pp. 35-40 (2013).

University of Toronto Conference, "Syngenite Formation"—T. Ramlochan, R.D. Hooton, date unknown.

WIPO International Search Report for corresponding PCT Appln. No. PCT/US2014/06518, EPO, Jan. 30, 2015.

STRUVITE-K AND SYNGENITE COMPOSITION FOR USE IN BUILDING MATERIALS

CROSS REFERENCE TO RELATED APPLICATIONS

This is a non-provisional application relying for priority on U.S. Provisional Application No. 61/865,029, filed Aug. 12, 2013; on U.S. Provisional Application No. 61/890,720, filed on Oct. 14, 2013 and on U.S. Provisional Application No. 61/892,581, filed Oct. 18, 2013, the entire specifications of which are incorporated by reference as if fully set forth herein.

BACKGROUND OF THE INVENTION

1. Field of the Invention

This invention relates generally to building materials and more specifically to building materials in which a desired final composition and ratio of Struvite-K and Syngenite is provided to impart specified and predetermined properties and characteristics to said building materials.

2. Background Art

For approximately four thousand years, and at least since Roman times, magnesium oxide (MgO) based cements have been used to build walls and structures. Within the last 50 years, improved magnesium oxide containing materials have been used for batch manufacture of slurries that are then poured into panel molds where they are allowed to cure for an extended period of time. The resulting products impart rigidity and structural integrity to said panel and thereby allow said panel to be fastened to wall assemblies.

Wallboard typically has a density range of from about 1,600 pounds (lbs.) to about 1,800 lbs. per thousand square feet (lbs/MSF) (about 7.8 kilograms (kg) to about 8.3 kg per square meters ($m^2$)) of about one-half inch (1.27 cm) board. Heavy or high-density gypsum wallboards are costly and more difficult to manufacture, transport, store, and manually install at job sites. The recent trend has been toward lighter or low-density boards. While wallboards having reduced densities through adding lightweight fillers and foams are known, wallboard having a density of less than about 1,600 lbs/MSF (about 7.8 kg per $m^2$) in a one-half inch (1.27 cm) board, renders the resulting board of low strength and may make the board unacceptable for commercial or residential use. Because extra high-density or heavy gypsum wallboard generally is not desirable for the reasons set forth above, research and development are proceeding apace in order to produce reduced weight or density boards without sacrificing board integrity and strength. One method of reduction of board is to use novel or non-gypsum materials for the core of the boards.

Struvite ($NaH_4(PO_4).6H_2O$) has been known as a naturally occurring mineral for over a century, and has been the subject of study in the health process of animals and sewage treatment. See, for example, US Published Patent Appl. No. 2013/0062289, among others. A more recent development has resulted in a similar, albeit artificially created, mineral, alternatively known as K-Struvite, Struvite-K or Struvite (K) (hereinafter "Struvite-K"), having the chemical formula ($KMg(PO_4).6H_2O$)). This essentially man-made mineral has been the subject of intense study because many of its salient characteristics, including its orthorhombic crystal structure, glassy sheen permitting substantially friction free motion, and resistance to heat transfer, have been found suitable in the building industry.

Because of these and other properties, and as a result of the desire in the building and construction industries to find a feasible alternative to gypsum boards as internal building materials, Struvite-K has been determined to provide a good heat resistant building board panel while remaining slightly elastic and is comparable as to ease of manufacture on a mass scale as is gypsum board.

It is well known that such magnesium oxychloride containing panels are more expensive, usually amounting to twice to three times the cost of traditional gypsum building panel alternatives. Therefore, these types of boards are not widely accepted as cost affordable building materials for wall boards or panels. Moreover, some of these magnesium oxychloride containing building panels produce free chlorine gas within the board material, and thus present major issues, such as leaching, foul odors, fastener and building structure corrosion. In addition, many of these types of boards will breakdown and decompose over time as they are not chemically stable. These types of boards and panels are particularly susceptible to long term water exposure, and are prone to fall apart under long exposures to such conditions.

In recent years, environmental and health safety driven building codes have mandated that only building materials capable of offering improved water resistance and or fire resistance can be used in certain construction structures and building methods. As a result, paperless gypsum and traditional cement building panels have evolved to satisfy these requirements. However, gypsum is not and cannot ever be water proof and or completely water resistant. Therefore, it is necessary that water resistant compounds, such as waxes or silicones, be added to their formulation to impart acceptable water resistance. In doing so, fire resistance of these building materials may be compromised, as the water resistant additives may contain chemicals that will contribute to fueling dangerous conditions during a fire.

Moreover, the traditional fiber cement and Portland cement building panels are extremely difficult to handle and work with when used in traditional building practices, and thus require more time, labor and specialized tools to prepare and install these types of building panel.

More recently, the international economic situation has affected the building and construction markets. Consequently, construction companies have been driven to seeking alternative building materials that offer improved performance characteristics that are at least an order of magnitude greater than those of traditional gypsum and cement building materials while simultaneously matching the cost effectiveness than gypsum and cement building materials.

It is for solving the simultaneous cost and effectiveness divide, while providing for a continuous board line that the novel invention herein disclosed has been developed. The twin considerations of functional effectiveness and reduction of costs, in the context of improved and engineered building materials designed to serve specific purposes, would provide an ideal building material if all the considerations are adjusted to obtain such boards or panels. None of the heretofore disclosed known prior art building board compositions can provide these capabilities None of the prior art methods known heretofore teach the inventive process of forming composite boards containing synthetic Struvite-K and Syngenite in specified ratios so as to provide desired characteristics and features on wall board panels.

SUMMARY OF THE INVENTION

Accordingly, there is provided herein a new and improved composition and process for the production of a novel building material, comprising as starting constituent compounds magnesium oxide (MgO), monopotassium phosphate (MKP) and stucco (calcium sulfate hemihydrate). The reaction products, Syngenite ($K_2Ca(SO_4)_2 \cdot H_2O$) and Struvite-K ($KMgPO_4 \cdot 6H_2O$) proceed through multi phase reactions, at times occurring simultaneously. The reactions are basic in the case of the hemihydrate and water and acidic for the Magnesium Oxide/MKP, both reactions taking place simultaneously and in parallel and may even compete with each other if the Struvite-K reaction is not buffered (rate slowed down) to allow the hemihydrate enough time and water to fully rehydrate. It is considered that the Syngenite reaction needs to achieve its full temperature rise (typically an exothermic reaction will occur up to a maximum temperature of 140° F. (60° C.),—depending on the purity of the hemihydrate, as well as its concentration). In this case the first co-reacting temperature rise as it is an endothermic reaction and the formation of Syngenite is taking place as a product of dissolution from the MKP-K is liberated from the MKP and together with the forming hemihydrate forms $K_2Ca(SO_4)_2 \cdot H_2O$(Syngenite) before the Struvite-K nears its own initial temp rise (an exothermic reaction—temperatures can hit a maximum of 212 F.° (100° C.). This temperature rise, if left unchecked, may pose a major destructive effect to the hemihydrate portion of the formed Syngenite even after it becomes fully rehydrated. The invention disclosed and claimed herein is a preferred set of ratios of chemical constituents and a method of manufacture of gypsum boards on a continuous line including predetermined and specified ratios of Struvite-K and Syngenite for specified purposes, optimized in respect of stoichiometry to reduce the combined heat of formation to non-destructive levels.

In one embodiment, the core reaction is essentially:

$$MgO + KH_2PO_4 + CaSO_4 \cdot \tfrac{1}{2}H_2O \rightarrow KMgPO_4 \cdot 6H_2O + K_2Ca(SO_4)_2 \cdot H_2O.$$

Figure 1:
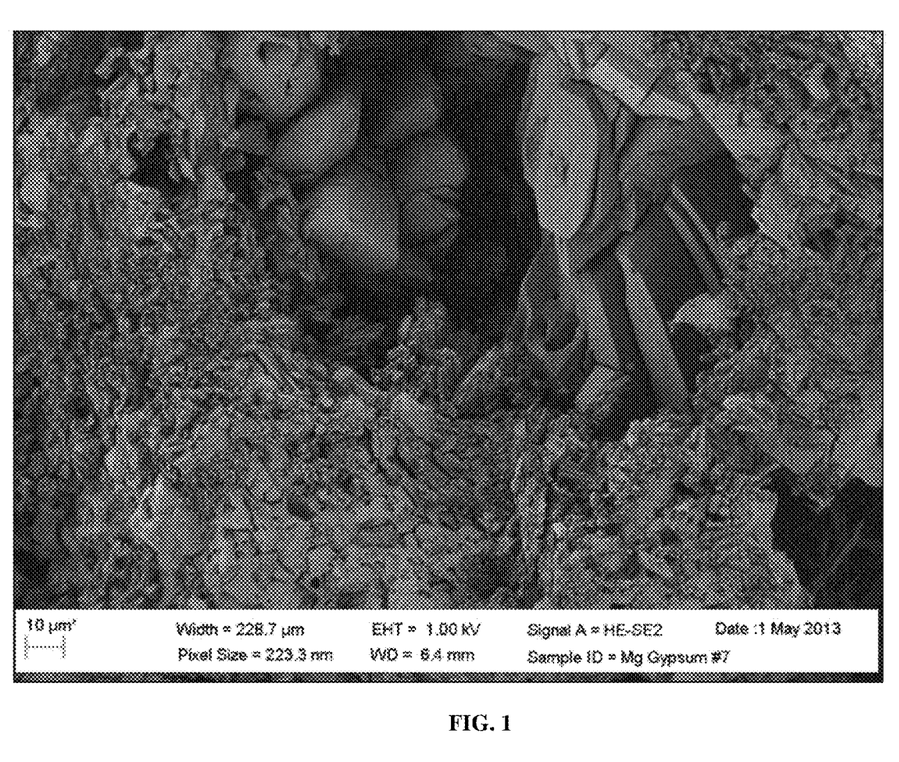
FIG. 1 is photomicrograph of a void in the resulting material developed in one of the tested formulations to determine the local structure of the resultant reaction products.

In another embodiment, together with the initial constituents and trace additives, the reaction may comprise several subreactions but the overall general mechanism is as follows:

$$3MgO + 3\,KH_2PO_4 + 2CaSO_4 \cdot \tfrac{1}{2}H_2O + 3H_2O \rightarrow KMgPO_4 \cdot 6H_2O + K_2Ca(SO_4)_2 \cdot H_2O + Ca^{+2} + 2Mg^{+2} + 2(PO_4)^{-3}$$

in the presence of Boric Acid ($H_3BO_3$), Naphthalene Sulfonate, Sulfuric Acid ($H_2SO_4$) and a siloxane, such as polydimethylsiloxane or poly(methyl hydrogen) siloxane. It should be noted that the reaction is not yet complete to achieve total reaction product mixtures, and the stucco hemihydrate ($CaSO_4 \cdot \tfrac{1}{2}H_2O$) will remain in excess, so that the remaining ionic materials, i.e., ($Ca^{+2}$, 2 $Mg^{+2}$ and $2(PO_4)^{-3}$) will either react with the remaining stucco or will form salt agglomerations upon drying. The identification of the precise reactant products remaining in the amorphous state is pending. It is considered that at least some of the stucco hemihydrate and the Magnesium Oxide remain unreacted, and these constituents structurally remain in an amorphous, randomly distributed matrix within the crystalline structures that are presented by the reacted Struvite-K and Syngenite, as shown in FIG. 1.

It should further be noted that the constituent materials may be provided in varying predetermined ratios, and may be included in specified ratios for the main constituents MgO: MKP as a 1:1 ratio up to a ratio of 1:3.0. Thus, although the constituent materials identified above and the resultant reactant products are shown as having specified ratios, it should be understood that varying the initial constituent ratios, as has been done in trials described below, may change the reaction products and the amounts of reacted and unreacted constituents. Specified weight percent ranges are provided for in the following proportions:

MgO: 3.33 to 70.00%
$KH_2PO_4$: 4.67 to 70.00%
$CaSO_4 \cdot \tfrac{1}{2}H_2O$: 10.5 to 90.0% adding up to 100%.

In a more refined ratio of the constituent starting materials, the following proportions are preferred:

MgO: 40.0 to 70.0%
$KH_2PO_4$: 10.0 to 40.00%
$CaSO_4 \cdot \tfrac{1}{2}H_2O$: 25.0 to 75.0% adding up to 100%.

To both of these solid constituent mixtures, water is added to commence the reaction in the proportion in a range of from 100:20 up to 100:40 solid to water. In a preferred form of the reaction, it is carried out in a reaction mixer in a continuous process, and the resulting slurry comprising mostly Struvite-K, Syngenite and gypsum provides a semi-liquid paste that is used in association with or without a gypsum core to provide one or more gypsum board products. In an optimal formulation, the ratio of MgO:MKP is from between 1:1.8 to 1:2.2, and in a most optimal formulation most closely most approximates 1:2.0.

In another embodiment, there is disclosed and claimed herein empirically derived ratios of constituent materials and guidelines for defining the process parameters in the manufacturing process of building materials containing unique building compositions including the minerals Struvite-K and Syngenite. These preferred ratios define the reactant composition of magnesium oxide (MgO), a phosphate and a potassium containing reactant, such as monopotassium phosphate ($KH_2PO_4$), and hemihydrate alpha and/or beta gypsum ($CaSa_1 \cdot \tfrac{1}{2}H_2O$), in solution with water ($H_2O$), together with judicious use of thermodynamic and kinetic properties of these chemical reactions, to guide the reactions in the desired direction and thereby to obtain the unique building materials having the desired physical properties.

The mathematical ratios utilize thermodynamic and stoichiometric principles and are grounded in the laws of conservation of atomic composition, energy and mass. The mathematical ratios use a desired composition in the final product building materials containing Struvite-K and Syngenite and are capable of predicting the following parameters of the process to within an accuracy of 5% of the actual process conditions:

1. Thermodynamic quantities of the process, including but not limited to the Gibb's free energy of formation, the enthalpy of formation, and the entropy of formation;
2. Rheology of the mixture, including but not limited to the density and viscosity;
3. Reactant masses and/or ratios of magnesium oxide (MgO), monopotassium phosphate ($KH_2PO_4$), stucco, in the form of Hemihydrate Alpha and or Beta gypsum ($CaSO_4 \cdot \tfrac{1}{2}H_2O$) and water ($H_2O$);
4. pH conditions;
5. Process conditions, including but not limited to temperatures and pressures of reaction.

Using appropriate mathematical equations, a user may determine a great variety of possible formulas and process iterations toward providing unique building materials containing Struvite-K ($KMg(PO_4) \cdot 6(H_2O)$) and Syngenite ($K_2Ca(SO_4)_2 \cdot H_2O$), all in accordance with the disclosure of the chemical reactions disclosed in aforementioned U.S. Provisional Application Nos. 61/865,029 and 61/892,581. Use of the processes and innovative methods described herein can provide cost efficient, ultra low weight wallboards having enhanced performance capabilities, such as mechanical strength, fire and moisture resistance and anti-microbial properties.

BRIEF DESCRIPTION OF THE DRAWINGS

The present invention will now be discussed in further detail below with reference to the accompanying figures in which.

DETAILED DESCRIPTION OF THE PREFERRED EMBODIMENTS

The precise quantitative equations are being refined with reliance on the experimental data compiled to date. Certain qualitative trends can be seen from preliminary lab results and scientific deductive reasoning using known scientific principles. The above listed 5 process conditions may be used to predict the necessary starting conditions based on the yields of Struvite-K and Syngenite desired in the final mixture. The possible modifications of the initial parameters will now be described in greater detail to show the effect of how varying any one particular parameter will change the ultimate resulting composition derived from the starting constituents.

To be avoided in the reaction is the overwhelming heat that the Magnesium Phosphate reaction generates (exothermically) which tends to destabilize/overwhelm the gypsum rehydration reaction and generate amorphous gypsum hemihydrate as an unwanted by-product. Thus, to provide an appropriate buffer is considered essential. Boric acid is ideal to retard the Magnesium Phosphate reaction, while it also serves as a mechanism to protect gypsum recrystallization against the adverse effects of thermal shock when the Magnesium Phosphate begins to form.

Using sulphuric acid ($H_2SO_4$) to pretreat the water and further accelerate the Struvite-K reaction may be helpful. To reduce costs of materials, as much as 70% stucco of the overall formulation can be used as a replacement beneficial co-reactant instead of Magnesium Oxide and monopotassium phosphate (MKP), since the gypsum is significantly cheaper and lighter weight than these materials.

As a by-product and a point of unexpected discovery, Syngenite is also generated, which is material that is more fire resistant than gypsum. However, Syngenite is not as strong and fire resistant as the combination of Struvite-K and Syngenite. Syngenite also provides an incidental benefit as a compositing factor between the Magnesium Phosphate and the gypsum hemihydrate, whereby it incorporates plasto-elastomeric characteristics, thereby rendering the final product significantly less brittle as well as more flexible, increasing manipulability, and making the board easier to score/cut. This is also a significant improvement over known Magnesium "Oxychloride" boards, for example, such as those described in U.S. Pat. Pub. 2013/0115835 and Portland cement based cement building panels.

Additionally and ideally, silicone is added to the mix to achieve four other complimentary characteristics, 1) forming a catalyzed silicone in the presence of the Magnesium Phosphate and acids
2) providing a mechanism for thermal resistance to the gypsum and permits recrystallization of the Magnesium Phosphate
3) serving to retard the Magnesium Phosphate reaction, and
4) providing a defoaming material to break down any foam that may be generated as a byproduct of the reaction of the Sulfuric Acid with $CaCO_3$, which is a known impurity in natural gypsum. Increasing the amount of silicone addition further imparts substantial water resistance to the board, and in increase in catalyzed silicone even more so. Total water resistance has been increased using significantly a lesser amount of silicone than is typically used/required to meet ASTM performance requirements for wet area building panels. Testing has shown that a maximum absorption rate of ≤2% may be achieved, while typically results on conventional water resistant gypsum wallboard, glass-reinforced gypsum boards, produce on average absorption that is at best 3.5% to 4% total water resistance.

However, the materials generated as a result of the present invention are by their nature water resistant and do not breakdown in the presence of water as would for example, Magnesium Oxychloride boards or traditional gypsum boards, which require the incorporation of water resistant additives, such as wax or silicone. Incorporation of a Polysiloxane in the present formulations restrains water wicking into the open areas and through the matrix of the products made in accordance with the present invention, essentially making it water impervious to an extent that water is no longer able to wick into the material. Moreover, even when bulk water or vapor water either wicks into or is transferred into the material/materials generated according to the present invention, it has no detrimental effect thereon and the material maintains its original strength. So as to prevent the intrusion of bulk or vapor water into and throughout the inventive compositions, a Polysiloxane is added only if complete water imperviousness is a requirement, for example, such as in regions and localities where building codes have driven the specification.

One method of using Struvite-K in building materials has been suggested for use in roads in replacement of Portland Cement. See for example: "Optimisation of the preparation of a phosphomagnesium cement based on struvite and K-struvite" H. Hammi and A. Mnif, Laboratoire de Valorisation des Matériaux Utiles, Centre National de Recherches en Sciences des Matériaux, Technopole Borj Cedria, Soliman, Tunisie, MATEC Web of Conferences Vol. 3, page 01071 (2013). Such compounds are also useful in the production of other building materials, such as wallboard panels, ceiling tiles, etc. Such uses require the efficient, timely and inexpensive production such that they can be incorporated into the structural members in which they are being used.

It has been noted that the production of such compounds and their ability to set in a timely fashion is dependent on the stoichiometry of the various precursors to the final set product, which is essentially in the form of $KMg(PO_4).6(H_2O)$. That is, it has been found as a surprising and unexpected result that the ratios of ingredients as follows will provide the best results in the desired characteristics:

The following data is used to drive the rapidity and direction of the reactions:
1. Thermodynamic Principles:
a. Gibb's free energy of formation—the Gibb's free energy of reaction will become more negative and, in part, more spontaneous as higher Struvite-K yields are produced, as it is shown with the faster reaction time when producing the samples.

b. Enthalpy of formation—the enthalpy of formation will become more negative as higher yields of Struvite-K are produced, as shown by the larger temperature increase in such samples at constant masses.
c. Entropy of formation—the entropy of formation will become more negative as higher yields of Struvite-K are produced, due to decreasing entropy during crystallization.
2. Rheology of the Reaction Mixture:
a. Density of the mixture—the density of the fluid before crystallization will increase as higher Struvite-K yields are produced, due to the increase bulk density of the mixture before setting.
b. Viscosity of the mixture—for the same reasons listed above, the viscosity will increase as higher Struvite-K yields are produced.
3. Reactant Masses and Stoichiometric Considerations:
a. Monopotassium phosphate ($KH_2PO_4$)—the monopotassium phosphate requirement will increase as higher Struvite-K yields are produced until the mass ratio of monopotassium phosphate ($KH_2PO_4$) to magnesium oxide (MgO) reaches 3.37:1, from stoichiometric considerations.
b. Magnesium oxide (MgO)—the magnesium oxide requirement will increase with higher Struvite-K yields until the mass ratio of monopotassium phosphate to magnesium oxide reaches 3.37:1, from stoichiometric considerations.
c. Stucco (gypsum hemihydrate)—the stucco requirement will not be affected by higher Struvite-K yields, as it is not considered in this reaction.
d. Water—the water requirement will increase as higher Struvite-K yields are produced until the mass ratio of monopotassium phosphate ($KH_2PO_4$) to water ($H_2O$) equals 2.96:1, from stoichiometric considerations. Water temperature is also considered a factor.
4. pH Requirements:
a. Based on experimental data as the pH is lowered with the help of any acid, the yield of Struvite-K increases, since the reaction happens faster and it uses the raw materials at an increased rate.
5. Process Reaction Conditions:
a. The reaction, as theorized, is a thermodynamically driven reaction. Therefore, starting at a higher temperature will yield lower amounts of Struvite-K.

The chemical reaction providing the optimum results has been determined to be:

the reaction occurring in the presence of small amounts of $H_2SO_4$, $H_3BO_3$, both acting as buffers for reducing the reaction rate, and one or more siloxanes to restrain water wicking and Naphthalene Sulfonate as a fluidizer.

The Struvite-K Reaction is an exothermic reaction and proceeds very rapidly:

The basic reactions that are considered to occur are set forth above and the reaction process that is considered to occur is described below. It should also be understood that the precise reaction mechanism remains under study, and that certain reaction parameters, such as pH, water temperature, and timing of mixing and additions, have been explored as severely affecting the reaction rates, products and final structures. The information derived therefrom is expected to provide a base of information that will enable customization of the reaction products and extent of completion of the reaction, as desired for specific applications.

In the current invention, it has been found that the degree and length of mixing plays a significant role in both how the reaction proceeds and the ultimate yield of Syngenite and Struvite-K. Using the ratios as provided above, it has been found that minimal mixing yields higher ratios of Syngenite and longer mixing yields higher ratios of Struvite-K. Unexpectedly, it was discovered that a short mixing period enables a first, low temperature generating exothermic reaction and, when the mixing is stopped minimally after 30 seconds to one minute, complete set/hardening of the slurry can take up to 50 minutes. X-Ray Diffraction (XRD) tests have indicated that samples mixed this way yield higher amounts of Syngenite than Struvite-K, as well as elevated ratios of unreacted MgO (Periclase has been observed) and Bassanite ($CaSO_4 \cdot \frac{1}{2}H_2O$). Though each sample appeared to be set after this short mixing, in fact it was unexpectedly discovered that the sample had only formed a shell around an unset—still fluid—inner core, and that the sample was maintaining a temperature around 86° F. The shell was broken open and all materials were found to go back into solution immediately when mixed with the still fluid inner core material. Further mixing for an additional 30 to 40 seconds instigated a second reaction—an exothermic reaction wherein the temperature climbed to a maximum of 212° F.—initially indicative of a magnesium phosphate reaction, but in fact, following an XRD test on this sample material, was determined to comprise Struvite-K.

Subsequent prolonged multi and singular stage hand and high speed mixing of follow-up samples composed/formulated with an identical formulation as listed below, demonstrated dramatically elevated Struvite-K yield ratios.

XRD results demonstrate the benefit of prolonged mixing of the specific formulation and its ratios are set forth below:

TABLE 1

| Samples | $KMgPO_4 \cdot 6H_2O$ (Struvite-K) (PDF-00-035-0812) | $K_2Ca(SO_4)_2 \cdot H_2O$ (Syngenite) (PDF-00-028-0739) | Unreacted MgO (Periclase) (PDF-00-045-0946) | $CaSO_4 \cdot 0.67H_2O$ (Bassanite) (PDF-00-047-0964) |
|---|---|---|---|---|
| A | 67.1 | 25.0 | 6.6 | 1.2 |
| B | 66.4 | 25.8 | 7.1 | 0.7 |
| C | 66.0 | 26.4 | 6.9 | 0.6 |
| D | 66.0 | 26.4 | 6.9 | 0.6 |

As a result of this discovery it is a product of the invention herein disclosed that mixing as described above in combination with the specific formulation shown above and raw material addition variations detailed below are novel and unexpected to one normally skilled in the art from the previously known magnesium oxide or magnesium oxychloride type boards.

By varying the reaction stoichiometry above, the reactions can be tailored to produce desired or customized percentages of the different products. For example, the reaction can be customized to produce the maximum amount of Struvite-K, as above, or to produce a maximum of the Syngenite, or a suitable desired combination of the two.

Combining the formulation above with suitable changes to the following ranges imparts improved economic efficiencies relating to large scale Struvite-K yield as a result of the process/formulation.

Figure 3:
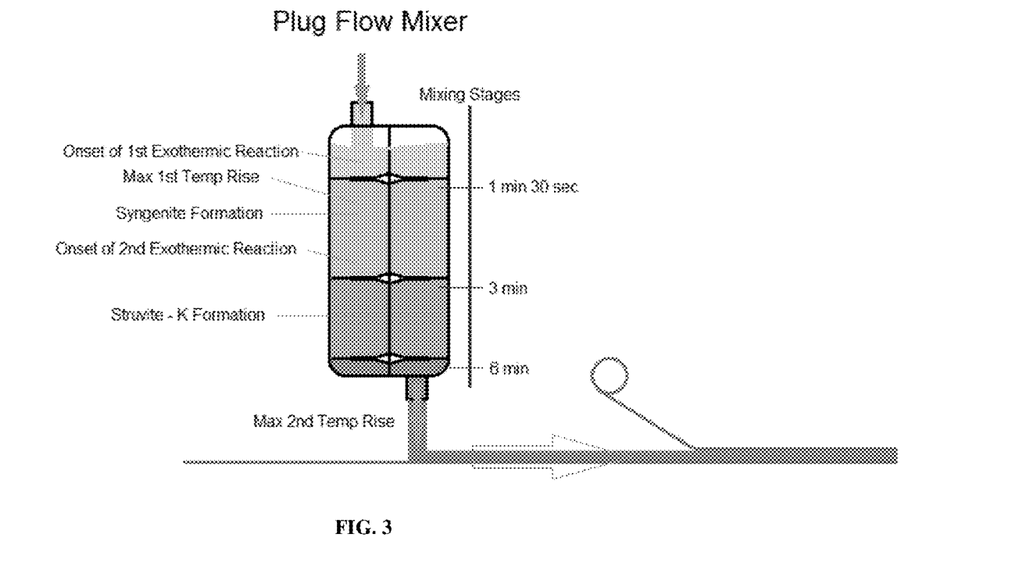
FIG. 3 is a schematic plan view showing in cross-section a plug flow mixer reactor such as may be utilized in the production of the inventive compositions of matter.

In order to generate more Struvite-K the following method is used:

a. Using a multi-stage mixing apparatus, such as a plug flow mixer as shown in FIG. 3, multilevel pen and or scraper mixer or combination of them, or using just a mixer that allows for a long dwell time with raw material supply and feed-through/output controls equivalent to a manufacturing speed for a typical 4 foot wide and ¼ to 1" thick board ranging from approximately a minimum of 20 feet/min to a maximum of 750 feet/min. The raw materials that are mixed and combined within the mixer are the following: (Dwell time must be equal to or greater than and min of 4 minutes and a max of 12 minutes).

≤17.2%=Magnesium Oxide (MgO): Lite dead burned, medium dead burned, hard dead burned MgO, or a combination of any two or three alternatives, are intended to optimize and reduce raw material cost meanwhile yielding both efficient and optimal performance features in the result composite generated slurry formulation.

≥34.5%=MKP (Mono-Potassium Phosphate or KDP Potassium Dihydrogen Phosphate—$KH_2PO_4$) will improve the molar ratio of Magnesium Oxide (MgO) to potassium Dihydrogen phosphate and also impart a reduction in the rate of reaction via reduced rate of dissociation. The preferred MKP or KDP may be either of a food grade or agricultural grade.

≤17.2%=Beta Hemihydrate (processed gypsum stucco—$CaSO_4 \cdot \frac{1}{2}H_2O$): as a co-reactant which generates an initial reaction that slows the overall reaction via an initial rehydration/uptake of associated water—an initial step which generates a first temperature rise reaction, an endothermic reaction with the potassium content (setting off a dissolution of the K from the MKP to join with the forming dihydrate to form Syngenite). The Hemihydrate may be of a minimum purity ranging from approximately 65% to a maximum purity of 100%. The higher purity hemihydrate improves the uptake of potassium as dihydrate is forming and thereby further slows the secondary $KMgPO_4 \cdot 6H_2O$ (Struvite-K) reaction and elevates the Struvite-K yield in the final reaction. Because the exothermic reaction that generates the $KMgPO_4 \cdot 6H_2O$ is so hot (up to 212° F. (100° C.)), the rehydrated dihydrate portion of the derived Syngenite calcines to a minor extent. The Potassium (K) that had been used up in the first Syngenite reaction is then released into solution in stages and is ultimately reused in the $KMg_2PO_4 \cdot 6H_2O$ generation process.

31.1%=$H_2O$ (Water)

Trace remaining additives all represent ≤1.5% of the overall mix in total combined addition.

Sulfuric Acid ($H_2SO_4$): is added to the water to change the pH and improve the instigation of the overall acid based reaction.

Boric Acid ($H_3BO_3$): Boric Acid is a significant additive specifically because it offers a benefit to both endothermic and exothermic reactions. In the first reaction it serves to protect the hemihydrate to water rehydration from the heat of the secondary MgO/MKP/$H_2O$ reaction, and allows the forming Syngenite to hold onto the K longer than if there were thermal shield being provided by the Boric Acid. In the case of the MgO/MKP/$H_2O$ reaction the Boric Acid is known retarder to Magnesium Phosphate Cement reactions.

Siloxanes, such as Polysiloxane $(C_2H_6OSi)_n$, polydimethylsiloxane $(CH_3[Si(CH_3)_2O]_nSi(CH_3)_3)$, and others, in very low addition amounts may be used as a defoamer as the MgO/MKP and an impurity within the Hemihydrate source ($CaCO_3$) reacts with the MgO in the presence of water to cause a foaming reaction that is not desirable. If no impurities are present, the Polysiloxane stays intact throughout the entire course of the first and second reactions.

Naphthalene Sulfonate, such as $C_{10}H_8NNaO_3S$, in very low additive amounts serves as a fluidizer or dispersant for the overall mix.

b. Higher Purity Beta Hemihydrate: the higher the purity of the hemihydrate the overall reaction slows down/retards and a greater uptake of K in the initial reaction which in turn causes more generation of Struvite-K in the final reaction as long as the additives in their current disclosed addition ratios are approximately maintained—but—there is a maximum yield limit that can be obtained. Decrease of either the MgO or the MKP addition will produce less Struvite-K. Increase in the MgO and or the MKP additive should generate equivalent or greater yield ratios of Struvite-K, but requires an increase in the Beta hemihydrate addition or an increase in the hemihydrate purity. In this case the Boric and Sulfuric Acid additions may also be increased.

The above described method changes the ratios somewhat so that combining the formulations that above with the following ranges will impart improved economic efficiencies relating to large scale Syngenite yield as a result of the process/formulation.

In order to generate more Syngenite, the following method is used:

a. The use of a multi-stage mixing apparatus such as a plug flow mixer, multilevel pin and or scraper mixer or combination of both or just a mixer that allows for a long dwell time with raw material supply and feed-through/output controls equivalent to a manufacturing speed ranging from approximately a minimum of 20 feet/min to a maximum of 750 feet/min. This permits the raw materials being mixed and combined within said mixer to the following ratios and will provide dwell times equal to or greater than and min of 2 minute or a max of 12 minutes:

≥17.2%=Magnesium Oxide (MgO): Lite dead burned, medium dead burned, hard dead burned MgO, or a combination of any two or three alternatives intended to best optimize raw material cost while yielding both efficient and optimal performance features in the result composite generated slurry formulation.

≤34.5%=MKP (Mono-Potassium Phosphate or KDP Potassium Dihydrogen Phosphate—$KH_2PO_4$) to improve the molar ratio of magnesium oxide to potassium Dihydrogen phosphate and as well, impart a reduction in the rate of reaction while via reduced rate of dissociation.

≥17.2%=Beta Hemihydrate (processed gypsum stucco—$CaSO_4 \cdot \frac{1}{2}H_2O$): as a co-reactant which generates an initial reaction that slows the overall reaction via an initial rehydration/uptake of associated water—an initial step which generates a first temperature rise reaction, an endothermic reaction with the potassium content (setting off a dissolution of the K from the MKP to join with the forming dihydrate to form Syngenite). The Hemihydrate may be of a minimum purity ranging from approximately 65% to a maximum purity of 100% wherein, said higher purity hemihydrate improves the uptake of potassium as dihydrate is forming and thereby further slows the secondary KMgPO$_4$.6H$_2$O (Struvite-K) reaction and elevates the Syngenite yield in the final reaction, if the exothermic reaction that generates the KMgPO$_4$.6H$_2$O is not hot enough or in a range no greater than 140° F. to 180° F. the rehydrating hemihydrate to dihydrate and then Syngenite (requiring the presence of the hemihydrate) does not calcine to any extent, and thus the available K to yield Struvite-K is reduced and results in a lower ratio of Struvite K to Syngenite.

31.1%=H$_2$O (Water)

The remaining additives all represent ≤1.5% of the overall mix in total combined addition.

With the changes in the ratios between the MgO, MKP and the CaSO$_4$.½H$_2$O to achieve desired results in the final product, as described above, appropriate changes will be required in the stoichiometry of these three ingredients.

Sulfuric Acid (H$_2$SO$_4$): is added to the water to change the pH and improve the instigation of the overall acid based reaction.

Boric Acid (H$_3$BO$_3$): The Boric Acid is a desirable ingredient specifically because it offers a benefit to both endothermic and exothermic reactions. In the first reaction it serves to protect the hemihydrate to water rehydration from the heat of the secondary MgO/MKP/H$_2$O reaction, and allows the Syngenite as it is forming to hold onto the K longer than if there were a shield being provided by the Boric Acid. In the case of the MgO/MKP/H$_2$O reaction, the Boric Acid is known to retard the Magnesium Phosphate Cement reactions. The Boric acid contribution and benefit to both reactions was not an intended result, and thus was an unexpected discovery.

Siloxanes, such as Polysiloxane (C$_2$H$_6$OSi)$_n$, polydimethylsiloxane (CH$_3$[Si(CH$_3$)$_2$O]$_n$Si(CH$_3$)$_3$), and others, in very low addition amounts are used as a defoamer as the MgO and an impurity within the Hemihydrate source (CaCO$_3$) reacts with the MgO in the presence of water to cause a foaming reaction that is not desired at present. If no impurity is present, the Polysiloxane stays intact throughout the entire course of the first endothermic and second exothermic reactions.

Naphthalene Sulfonate, such as C$_{10}$H$_8$NNaO$_3$S, in very low additive amounts serves as a fluidizer or dispersant for the overall mix.

b. Higher Purity Beta Hemihydrate: the higher the purity of the hemihydrate the overall reaction slows down/retards and a greater uptake of K in the initial reaction which in turn causes more generation of Syngenite in the final reaction as long as the additives in their current disclosed addition ratios are approximately maintained—but—there is a maximum yield that can be obtained. Maintaining a second exothermic reaction that does not exceed 180° F. (82.2° C.) is critical in generating a greater ratio of Syngenite to Struvite-K. If you decrease either the MgO or the MKP addition then you have less Struvite-K. In this case the Boric and Sulfuric Acid additions must also be increased.

2. To generate equivalencies of both Syngenite and Struvite-K—the reactions must be balanced in a way to enable the second exothermic reaction to exist within the 180° F. to 212° F. (82.2-100° C.) range, but at a limited exothermic temperature and time of reaction so as to reduce the ratio of Struvite-K formation.

It has been found that the mixture as set forth above provides a significantly greater yield of the Struvite-K, up to 67%, than heretofore provided by known processes, and all with a minimum of additional necessary inputs.

In the end, the gypsum component makes the board panel more affordable and the final product is a dramatic improvement both from a physical and long-term performance standpoint over conventional gypsum panels. It is naturally UV resistant, that is, protects against penetration of ultraviolet rays, so it needs no performance surface coating and it is extremely water resistant. A similar product described by Surace in GB 2,445,660 (equivalent US Pat Pub. No. 2008/171,179) while being capable of being produced in a continuous and or batch process, clearly states that the use of hemihydrate gypsum stucco is to be avoided because of the requirement of significant energy input needed to dry the hemihydrate. In the above described, product because of the simultaneous production of Syngenite, a similarly stoichiometric reaction that requires no added external heat for drying, provides the necessary thermal energy for the reaction. This is a direct result of the reaction of the hemihydrate with the monopotassium phosphate (MKP).

In use, the boards having the specified compositions of Struvite-K in specified ratios to the Syngenite can be tailored for specific desired uses.

An initial attempt to provide a light weight gypsum board was included following steps to obtain a sample result:

The initial base material formulation was a 1:1:1 mixture, that is, comprising in equal proportions MgO:MKP-(KH$_2$PO$_4$):stucco (hemihydrate CaSO$_4$.½H$_2$O), with the MgO, MKP and hemihydrate gypsum being added in doses of 15 g each as dry powder to the mixer and dry premixed for 45 seconds to ensure homogeneity of the materials. Additional base materials additions were 0.03 g silicone oil, comprising polymethylhydrogensiloxane, and a dispersant comprising 0.05 g polynapthalene sulfonate.

To this base mixture following the dry mix for all samples below, 17 g water (H$_2$O) was added. This base mixture was then used for several lab runs, by the additions as noted in the table below, to obtain several samples as listed in TABLE 2. The mixture, including the water, was mixed in a mixer (by hand) for a period of about 30 to 60 seconds in a first phase, and then allowed to partially set and then mixing was again begun on the product which had partially set in a shell around the outside, leaving a central core still in a liquid state. When the mixing was begun in the second phase, the set outer shell immediately went back in to solution, and after mixing again for about 30 to 45 seconds, the material was allowed to set completely.

TABLE 2

| Sample No. | Utilizing the above Base formulation the following materials were added by weight |
|---|---|
| 1 | boric acid (H$_3$BO$_3$) 1 g |
| 2 | H$_2$SO$_4$ 0.05 g |
| 3 | H$_2$SO$_4$ 0.05 g + boric acid (H$_3$BO$_3$) 0.25 g |
| 4 | H$_2$SO$_4$ 0.05 g + (H$_3$BO$_3$) boric acid 0.50 g |
| 5 | H$_2$SO$_4$ 0.05 g + boric acid (H$_3$BO$_3$) 0.25 g + an extra 2.25 g H$_2$O |
| 6 | H$_2$SO$_4$ 0.05 g + boric acid (H$_3$BO$_3$) 0.25 g + extra 7.5 g KH$_2$PO$_4$ (1.5x of base form.) |
| 7 | H$_2$SO$_4$ 0.05 g + boric acid (H$_3$BO$_3$) 0.25 g + extra 15 g KH$_2$PO$_4$ (2x of base form.) |
| 8 | Same as the base, except the ratio is 1:2:1 of the MgO:MKP – (KH$_2$PO$_4$):stucco hemihydrate (CaSO$_4$•1/2H$_2$O) |

For each of these samples, the resulting materials were analyzed for content, and homogeneity. Quantitatively, TABLE 3 below shows the results, and these are similar in format to those of TABLE 1 above.

TABLE 3

| Sample no. | $KMgPO_4 \cdot 6H_2O$ (Struvite-K) (wt. %) | $K_2Ca(SO_4)_2 \cdot H_2O$ (Syngenite) (wt. %) | Unreacted MgO (Periclase) (wt. %) | $CaSO_4 \cdot 0.67H_2O$ (Bassanite) (wt. %) |
|---|---|---|---|---|
| 1 | 23.1 | 46.6 | 29.1 | 1.2 |
| 2 | 20.0 | 49.2 | 29.9 | 1.0 |
| 3 | 18.7 | 48.8 | 31.5 | 1.0 |
| 4 | 19.4 | 47.4 | 32.2 | 1.0 |
| 5 | 23.0 | 47.4 | 28.6 | .9 |
| 6 | 20.1 | 33.9 | 42.2 | 3.9 |
| 7 | 58.8 | 24.0 | 7.3 | 9.9 |
| 8 | 52.8 | 29.8 | 16.1 | 1.3 |

In addition to the above quantitative results, several observations were made, including that the process yielded a formulation that was process friendly and yielded a board with a stronger core. It was also determined that changing the timing of the reactions by, for example, increasing mix time from one stage to two stages ranging from 45 to 90 seconds yielded a stronger core material with water resistance without need for wax or silicone. This is presumed to result form a higher Struvite-K yield. Finally, a close microscope examination of the set materials indicated that in many of the samples, crystallization occurred in a non-homogenous way in the final materials. That is, well formed crystallization occurred. The crystals, believed to be Struvite-K crystals, were determined to have formed in a boundary layer around the void spaces and between the voids and rest of the mixed product. A photomicrograph of one of these is shown in FIG. 1. As can be seen, the photomicrograph shows crystallization of the boundary between the void space and the surrounding matrix. This is understood to comprise a crystalline Syngenite/Struvite-K structure, resulting in better structural rigidity in the resultant composition.

In second batch of lab runs, a similar procedure was run as set forth above. The following TABLE 4 shows the sample constituents again using a base mixture as follows: 15 g MgO, 15 g MKP ($KH_2PO_4$), 0.15 g $H_2SO_4$, 0.25 g boric acid ($H_3BO_3$), 0.05 g dispersant. One difference in this base structure from the one in TABLE 2 above is that the amount of stucco (hemihydrate $CaSO_4 \cdot \frac{1}{2}H_2O$) was varied, requiring an increase in water as well.

TABLE 4

| Sample No. | Utilizing the above Base formulation the following materials were added by weight |
|---|---|
| 1A | 15 g stucco, 20 g water |
| 2A | 20 g stucco, 24 g water |
| 3A | 25 g stucco, 28 g water |
| 4A | 30 g stucco, 32 g water |
| 5A | 35 g stucco, 36 g water |
| 6A | 40 g stucco, 40 g water |
| 7A | 50 g stucco, 48 g water |
| 8A | 60 g stucco, 56 g water |
| 9A | 15 g stucco, 27 g water, an extra 15 g MKP |
| 10A | 50 g stucco, 34 g water |

For each of these samples, the resulting materials were analyzed for content, and homogeneity. Quantitatively, TABLE 5 below shows the results, and these are similar in format to those of TABLES 1 and 3, above.

TABLE 5

| Sample no. | $KMgPO_4 \cdot 6H_2O$ (Struvite-K) (wt. %) | $K_2Ca(SO_4)_2 \cdot H_2O$ (Syngenite) (wt. %) | Unreacted MgO (Periclase) (wt. %) | $CaSO_4 \cdot 0.67H_2O$ (Bassanite) (wt. %) | $CaSO_4 \cdot 0.5H_2O$* (Bassanite) (wt. %) | $CaSO_4 \cdot 2H_2O$ (Gypsum) (wt. %) |
|---|---|---|---|---|---|---|
| 1A | 20.6 | 46.0 | 29.8 | 3.7 | <0.1 | <0.1 |
| 2A | 14.0 | 45.1 | 27.6 | <0.1 | 13.3 | <0.1 |
| 3A | x | 56.6 | 26.9 | <0.1 | 16.5 | <0.1 |
| 4A | x | 57.4 | 21.5 | <0.1 | 21.2 | <0.1 |
| 5A | x | 50.7 | 21.5 | <0.1 | 27.8 | <0.1 |
| 6A | x | 44.0 | 21.4 | <0.1 | 34.6 | <0.1 |
| 7A | x | 43.4 | 14.9 | <0.1 | 41.7 | <0.1 |
| 8A | <0.1 | 45.5 | 11.0 | <0.1 | 43.5 | <0.1 |
| 9A | 66.2 | 27.0 | 6.8 | x | <0.1 | <0.1 |
| 10A | <0.1 | 2.5 | <0.1 | 3.2 | <0.1 | 94.4 |

*An analytical incongruity is apparent in two distinct forms of Bassanite: $CaSO_4 \cdot 0.67H_2O$ (47-964) and $CaSO_4 \cdot 0.5H_2O$ (Bassanite). These phases are similar and are both modelled as Bassanite.

Additional samples, deviating from the 1:1:1 ratio of the previous mixtures and not using the base composition of the first eight samples, were made up by use of the following formulations listed individually in TABLE 6 below:

TABLE 6

| Sample No. | Constituent materials | MgO/MKP Ratio |
|---|---|---|
| 11A | 15 g MgO, 50.65 g mKP, 33.52 g water (stoichiometric struvite production) | 1:3.38 |
| 12A | 15 g MgO, 7.5 mKP, 20 g stucco, 24 g water, + 0.15 g $H_2SO_4$ + 0.25 g boric acid ($H_3BO_3$) + 0.05 g dispersant | 2.0:1.0 |
| 13A | 15 g MgO, 7.5 mKP, 30 g stucco, 32 g water, + 0.15 g $H_2SO_4$ + 0.25 g boric acid ($H_3BO_3$) + 0.05 g dispersant | 2.0:1.0 |
| 14A | 15 g MgO, 7.5 mKP, 40 g stucco, 40 g water, + 0.15 g $H_2SO_4$ + 0.25 g boric acid ($H_3BO_3$) + 0.05 g dispersant | 2.0:1.0 |
| 15A | 15 g MgO, 7.5 mKP, 50 g stucco, 48 g water, + 0.15 g $H_2SO_4$ + 0.25 g boric acid ($H_3BO_3$) + 0.05 g dispersant | 2.0:1.0 |

For each of these samples, the resulting materials were analyzed for content, and homogeneity. Quantitatively, TABLE 7 below shows the results, and these are similar in format to those of TABLES 1, 3, and 5 above.

TABLE 7

| Sample no. | KMgPO$_4$•6H$_2$O (Struvite-K) (wt. %) | K$_2$Ca(SO$_4$)2•H$_2$O (Syngenite) (wt. %) | Unreacted MgO (Periclase) (wt. %) | CaSO$_4$•0.67H$_2$O (Bassanite) (wt. %) | CaSO$_4$•0.5H$_2$O* (Bassanite) (wt. %) | CaSO$_4$•2H$_2$O (Gypsum) (wt. %) | Mg(OH)$_2$ (Brucite) |
|---|---|---|---|---|---|---|---|
| 11A | No data available | | | | | | |
| 12A | <0.1 | 36.3 | 21.2 | <0.1 | 19.9 | <0.1 | 22.6 |
| 13A | <0.1 | 33.2 | 10.8 | <0.1 | 29.5 | x | 26.5 |
| 14A | <0.1 | 27.0 | 4.3 | <0.1 | 36.8 | 12.1 | 19.8 |
| 15A | x | 30.6 | 5.6 | <0.1 | <0.1 | <0.1 | 25.9 |

As is evident in samples 12-15, a significant amount of the Magnesium oxide (MgO) failed to take part in the main reaction and instead generated a significant amount of a reaction by-product of a mineral identified as Brucite, (Mg(OH)$_2$), which was not present in the other samples.

Figure 2:
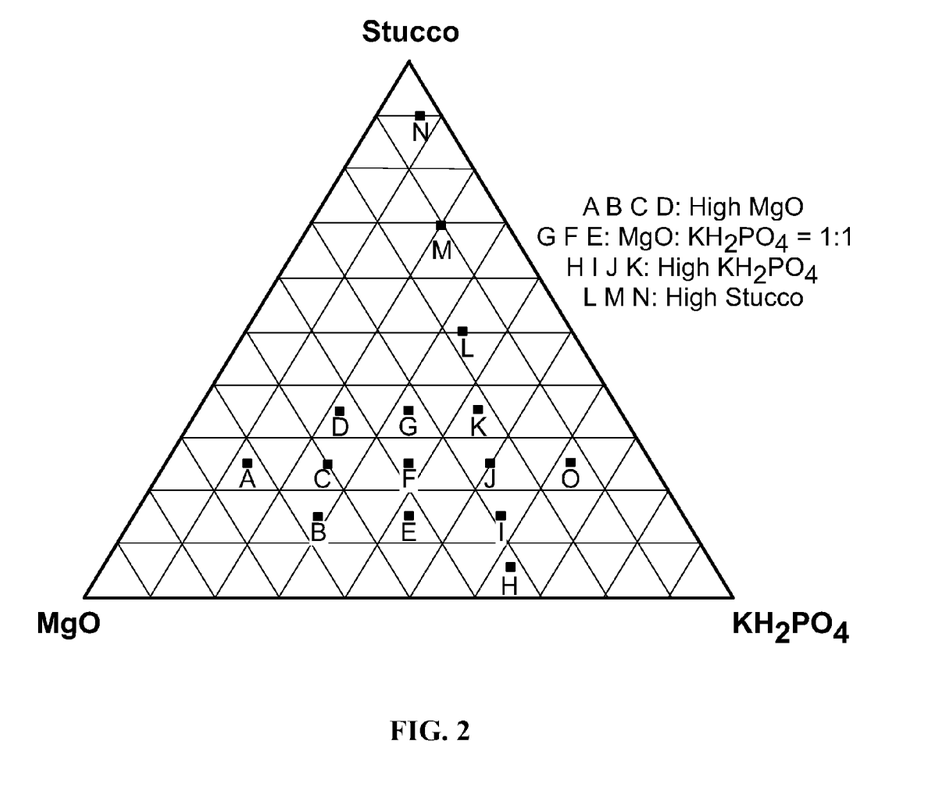
FIG. 2 is a ternary graph showing the proportions of MgO:MKP:stucco for specified trial runs and plots the various formulations used in the testing regime.

A third lab test of 11 samples was conducted and a similar manufacturing procedure was run as set forth above. This test run was specifically directed to determine what variables in the production affect different specified characteristics of the resultant material compositions. The characteristics tested for across the different sample formulations were water absorption, shrinkage in a furnace muffle test that is a direct indicator of fire reissuance, and mechanical strength. The formulations were similar to those tested above, with the omission of the additives, such as boric acid, Polysiloxane, Lignosulfonate, Sulfuric acid, etc. To isolate the variable tested for, only the four essential constituents were utilized including the group magnesium oxide (MgO), Mono-Potassium Phosphate-MKP (KH$_2$PO$_4$), stucco (CaSO$_4$.½H$_2$O). The samples had the formulations with the water comprising 30 weight % of the final mixture:

2. As can be seen from a comparison of the plots of the different formulations in the phase diagram, some like L, M and N are high stucco formulations, A-D are high MgO formulations, and group comprising H-N are high MKP formulations, while E, F and G are equally weighted between MgO and MKP. As can be seen by the linear progression of the connecting lines in the vertical directions, a pattern was intended to maintain as constant ratio between MgO and MKP while varying only the stucco content. In the horizontally aligned points, the stucco content is maintained constant and the ratio between MgO and MKP is varied. As result of the testing in the different formulations and trends seen from the compiled data, and the following major indications are provided as described below.

It should also be appreciated that the weight percent of water in the samples set forth above was nominally set a 30 weight percent, the percentage of water relative to the solid constituents can also be varied anywhere from 20 to 40 weight percent, with 30 weight percent being nominally used as a benchmark for having a sufficient amount of liquid solvent to initiate the reaction of the constituents.

TABLE 8

| Sample ID | The formulations of the following solid materials only, by weight percent, and water added 30% | Same formulation including 30 weight percent of water |
|---|---|---|
| A | MgO 62.5, MKP (KH$_2$PO$_4$) 12.5, stucco 25.0, water | MgO 43.75, MKP (KH$_2$PO$_4$) 8.75, stucco 17.50, water 30.0 |
| B | MgO 57.67, MKP (KH$_2$PO$_4$) 28.33, stucco 15.0, water | MgO 39.67, MKP (KH$_2$PO$_4$) 19.83, stucco 10.5, water 30.0 |
| C | MgO 50.0, MKP (KH$_2$PO$_4$) 25.0, stucco 25.0, water | MgO 35.0, MKP (KH$_2$PO$_4$) 17.50, stucco 17.50, water 30.0 |
| D | MgO 43.33, MKP (KH$_2$PO$_4$) 21.67, stucco 35.0, water | MgO 30.33, MKP (KH$_2$PO$_4$) 15.17, stucco 24.50, water 30.0 |
| E | MgO 42.50, MKP (KH$_2$PO$_4$) 42.50, stucco 15.0, water | MgO 29.75, MKP (KH$_2$PO$_4$) 29.75, stucco 10.5, water 30.0 |
| F | MgO 37.5, MKP (KH$_2$PO$_4$) 37.5, stucco 25.0, water | MgO 26.25, MKP (KH$_2$PO$_4$) 26.25, stucco 17.50, water 30.0 |
| G | MgO 32.5, MKP (KH$_2$PO$_4$) 32.5, stucco 35.0, water | MgO 22.75, MKP (KH$_2$PO$_4$) 22.75, stucco 24.50, water 30.0 |
| H | MgO 31.67, MKP (KH$_2$PO$_4$) 63.33, stucco 5.0, water | MgO 22.17, MKP (KH$_2$PO$_4$) 44.33, stucco 3.50, water 30.0 |
| I | MgO 28.33, MKP (KH$_2$PO$_4$) 56.67, stucco 15.0, water | MgO 19.83, MKP (KH$_2$PO$_4$) 39.67, stucco 10.5, water 30.0 |
| J | MgO 25.0, MKP (KH$_2$PO$_4$) 50.0, stucco 25.0, water | MgO 17.5, MKP (KH$_2$PO$_4$) 35.0, stucco 17.5, water 30.0 |
| K | MgO 21.67, MKP (KH$_2$PO$_4$) 43.33, stucco 35.0, water | MgO 15.17, MKP (KH$_2$PO$_4$) 30.33, stucco 24.5, water 30.0 |
| L | MgO 16.67, MKP (KH$_2$PO$_4$) 43.33, stucco 50.0, water | MgO 11.67, MKP (KH$_2$PO$_4$) 23.00, stucco 49.0, water 30.0 |
| M | MgO 10.0 MKP (KH$_2$PO$_4$) 33.33, stucco 70.0, water | MgO 7.0 MKP (KH$_2$PO$_4$) 14.33, stucco 70.0, water 30.0 |
| N | MgO 3.33, MKP (KH$_2$PO$_4$) 6.67, stucco 90.0, water | MgO 2.33, MKP (KH$_2$PO$_4$) 4.67, stucco 63.0, water 30.0 |
| O | MgO 12.5, MKP (KH$_2$PO$_4$) 62.5, stucco 25.0, water | MgO 8.75, MKP (KH$_2$PO$_4$) 43.75, stucco 17.5, water 30.0 |

As a visual aid, the solid constituents, by weight percent have been mapped in a ternary diagram as illustrated in FIG.

It is also important to recognize that water temperature is a critical factor in the process. Specifically, the temperature of the water as it is added to the solid constituents is an important consideration as it affects the rate of reactivity of the constituents. An increase in the temperature of the water decreases the mix reactivity rate, and simultaneously increases the time that must pass for the slurry to set. Standard water temperature is about between 20.0° C. and 25° C. Thus, it is important to monitor and control the reaction rates to such rates that maintain the integrity of the resulting product, as too high a temperature, that is, over 50° C., can lead to cracking of the surface during the hardening process as the slurry sets. The main learning from this study is the inverse relationship of reaction rate when compared to initial water temperature.

From the testing regime, the following clear trends for characteristics have been determined: The inventive magnesium phosphate (Struvite-K/Syngenite) compositions exhibited significantly improved compression strength, water absorption and fire resistance compared to a simple Gypsum composition. Moreover, it has been determined that the product characteristics are indeed tunable with variables in the process parameters and raw material ratios and properties thereof. For example, those samples processed with lower water content exhibited higher compressive strength, higher fire and water resistance. Samples with higher shear rate/time exhibited higher compressive strength and marginal decrease in fire and water resistance. Shear rate and time is the vigor with which the mixture is mixed in a mixer, the amount of time the mixing process proceeds and whether the mixing was done by hand or mechanically.

Samples processed at cooler temperatures exhibited higher compressive strength and marginal decrease in fire and water resistance.

Samples with MgO calcined at higher temperature exhibited higher strength, samples with coarser MgO exhibited lower strength, which exhibits an opposite behavior to that of water absorption and fire shrinkage properties.

Additionally, it was noted that initial water temperatures were crucial in amount of and timing of delivery of the water.

Another sample production in an inline production run was attempted on an actual board forming line, in which the lab runs were scaled up by about 100 times to determine if the process is feasible for use in gypsum board production utilizing the inventive material combinations. Essentially the same formulations were utilized, with the obvious exception that all the amounts were scaled up, and a much larger mixer and reactor vessel or chamber was required. The procedure also needed to be modified in significant ways to enable the continuous, rather than batch, production of the inventive material compositions for use in a board line running at almost normal speed of running or a round 40 feet per minute.

Certain additional equipment was required for this production run not needed in the lab runs, including a tank reactor, a mixer, one or more pumps, a roller coater, perhaps two one for each of the two surface layers, and a core gypsum mixer and pump for providing a continuous flow of the core gypsum, that is, the lightweight core gypsum, that will make up the central layer that will ultimately comprise the central or core layer having little if any of the Struvite-K and Syngenite reaction products. Thus, the final desired product is to be a surface layer coated with the inventive material compositions "wrapped around" a gypsum core.

The procedure to manufacture the surface layer coatings is essentially the same as those described above, except adjustments are required to be made for the vastly increased scale of the constituent materials. The following step-by-step procedure is expected to produce the necessary coating layer:

Pre-mix the solid mixture, comprising a 1:1:1 ratio, that is, MgO:MKP-($KH_2PO_4$):stucco (hemihydrate $CaSO_4 \cdot \frac{1}{2}H_2O$) the pre-mix phase to last form between 30 to 60 seconds. To ensure that enough of the mixture is made, it is expected that about a 15 kg amount of each of the base constituents is made. A proportional amount of siloxane and a defoamer, and a dispersant, such as polynapthalene sulfonate, may be added to this mixture.

Add water in about the same proportion, or about 17 kg.

Mix the resulting slurry for between 30 to 60 seconds in the large continuous mixer. After 15 seconds of mixing, the mixture started to solidify. It has been found that continued mixing will re-liquify the mixture. This is Phase I mixing.

Upon finishing with this initial mixing time, a timing sequence was commenced. Each minute after this initial Phase I mixing time, the mixture was again mixed vigorously for 5 second periods separated by 55 second intervals. This is the Phase II mixing.

The formulation used in the production run causes the product to set-up anywhere from 5-20 minutes after the water is added to the powders. Due to the type of mixer used, however, the mixing occurred unevenly, no product was obtained out of the mixer/reactor in any appreciable amounts for technical reasons. Further testing is needed to validate the scale up and continuous production run model.

The invention herein has been described and illustrated with reference to the embodiments of FIGS. 1-3, but it should be understood that the features and operation of the invention as described are susceptible to modification or alteration without departing significantly from the spirit of the invention. For example, the variations in starting materials of the various elements, or the specified reaction conditions may be altered to fit specific applications and desired yields. Also, additional variations may be introduced to provide differences in the resulting materials. For example, alternative additives to the starting constituents may include, in combination and or permutations of the listing herein, Boric acid, Polysiloxane defoamer, Lignosulfonate, Sulfuric acid, deionized water, tap water, and others as these become known to affect the reactions.

In addition, the mixing process and speed may be varied to obtain more optimal desired results. Other variables that may be utilized to optimize results are used natural instead of Synthetic stucco, the order and timing of additions and ingredients may be varied, and with the introduction of productions runs, mechanical mixing of the constituents in for example, pipe reactors or tube of a given length containing static mixers therein may enable multi-stage mixing of the constituent to provide a constant flow for in line flow mixing and just in time delivery to the gypsum board forming table. Other variables that may have an effect on resulting ratios and products may include varying the sate as well as the ratio of the raw constituent materials. These may include varying the addition rate, temperatures of the constituents, timing of additions, particle size, mix time, and other factors that may be determined as experience is gained with the reaction processes.

Accordingly, the specific embodiments illustrated and described herein are for illustrative purposes only and the invention is not to be considered as being limited except by the following claims and their equivalents.

What is claimed is:

1. A process for the continuous manufacture of a composition for use in a building product comprising:
   a) providing a mixer reaction chamber;
   b) continuously feeding constituent materials into the mixer reaction chamber;
   c) continuously mixing the constituent materials within said mixing reaction chamber to produce a slurry;

d) withdrawing the slurry from the mixer reaction chamber; and e) utilizing said slurry in the manufacture of a building product;

wherein said solid constituent materials comprise the following in specified ranges by weight percent:

MgO: 3.33 to 70.00%

$KH_2PO_4$: 4.67 to 70.00% stucco hemihydrate $CaSO_4 \cdot \frac{1}{2}H_2O$: 10.5 to 90.0% all adding up to 100% and addition of water: 20.0 to 40.0% of the constituent solid materials.

2. The process for the continuous manufacture of a composition according to claim 1 wherein the specified ranges of said solid constituent materials further comprise:

MgO: 40.0 to 70.0%

$KH_2PO_4$: 10.0 to 40.00% stucco hemihydrate $CaSO_4 \cdot \frac{1}{2}H_2O$: 25.0 to 75.0% and including an amount of 20.0 to 40.0% by weight of water relative to the solid constituents.

3. The process for the continuous manufacture of a composition according to claim 1 wherein the specified ranges of said solid constituent materials further comprise a ratio of the MgO to the $KH_2PO_4$ between 1:1.0 and 1:3.0.

4. The process for the continuous manufacture of a composition according to claim 3 wherein the specified ranges of said solid constituent materials further comprise a ratio of MgO to $KH_2PO_4$ between 1:1.9 and 1:2.2.

5. The process for the continuous manufacture of a composition according to claim 1 wherein the specified ranges of said constituent materials further comprises a defoamer.

6. The process for the continuous manufacture of a composition according to claim 1 wherein the specified ranges of said constituent materials further comprises a dispersant.

7. The process for the continuous manufacture of a composition according to claim 1 wherein the specified ranges of said constituent materials further comprises $H_2SO_4$.

8. The process for the continuous manufacture of a composition according to claim 1 wherein the specified ranges of said constituent materials further comprises rate retarding compound selected from the group consisting of boric acid ($H_3BO_3$) and sulfuric acid ($H_2SO_4$).

9. The process for the continuous manufacture of a composition according to claim 8 wherein the specified ranges of said constituent materials further comprises a silicone oil selected from the group consisting of polysiloxane $(C_2H_6OSi)_n$, polydimethylsiloxane $(CH_3[Si(CH_3)_2O]_nSi(CH_3)_3)$, polydimethylsiloxane and poly(methyl hydrogen) siloxane and the dispersant further comprises polynapthalene sulfonate.

10. The process for the continuous manufacture of a composition according to claim 8 further comprising a wax emulsion additive.

11. The process according to claim 1 wherein the constituent materials are reacted within the reaction mixer according to the following mechanism:

$MgO + KH_2PO_4 + CaSO_4 \cdot \frac{1}{2}H_2O$ to produce in varying amounts $KMgPO_4 \cdot 6H_2O$ and $K_2Ca(SO_4)_2 \cdot H_2O$.

12. The process according to claim 1 wherein the constituent materials are reacted within the reaction mixer according to the following equation:

wherein the reaction occurs in the presence of one or more of the compounds selected from the group consisting of sulfuric acid, boric acid, a siloxane and naphthalene sulfonate.

* * * * *